US008639786B2

(12) United States Patent
Little (10) Patent No.: US 8,639,786 B2
(45) Date of Patent: Jan. 28, 2014

(54) CONSISTENCY DOMAINS FOR REPLICATION IN DISTRIBUTED COMPUTING

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 404 days.

(21) Appl. No.: 12/986,845

(22) Filed: Jan. 7, 2011

(65) Prior Publication Data

US 2012/0179791 A1 Jul. 12, 2012

(51) Int. Cl.
*G06F 15/177* (2006.01)

(52) U.S. Cl.
USPC .......................................... 709/221; 709/220

(58) Field of Classification Search
None
See application file for complete search history.

(56) References Cited

U.S. PATENT DOCUMENTS

2007/0156842 A1* 7/2007 Vermeulen et al. ........... 709/217

OTHER PUBLICATIONS

Wokoma, et al., "A Weakly Coupled Adaptive Gossip protocol for Application Level Active Networks" 2002, Policy '02 Proceedings of the 3rd International Workshop on Policies for Distributed Systems.*
Beyer et al., "Implementing Network Partition-Aware Fault-Tolerant CORBA Systems" Apr. 10-13, 2007, 8 pages, The Second International Conference on Availability, Reliability and Security, ARES 2007.
Birman, Kenneth P., "Replication and Fault-Tolerance in the Isis System" 1985, pp. 79-86, Association for Computing Machinery.
Bouwmeester, Leon, "Using Atomic Actions in Replica Groups to Simplify the Replication Implementation" Nov. 1993, 12 pages, Intelligent Networked Computing Laboratory, HP Laboratories Bristol, Hewlett-Packard Company.
Eugster, et al., "Epidemic Information Dissemination in Distributed Systems" 2004, p. 60-67, School of Computer & Community Science, Swiss Federal Institute of Technology, Lausanne, Switzerland.
Golding, Richard Andrew, "Weak-consistency group communication and membership" Dec. 1992, 165 pages, University of California Santa Cruz.
Jelasity, et al., "Gossip-Based Aggregation in Large Dynamic Networks" Aug. 2005, pp. 219-252, ACM Transactions on Computer Systems, vol. 23, No. 3.
Kempe, David, "Spatial Gossip and Resource Location Protocols" 2001, 22 pages, Proceedings of the thirty-third annual ACM symposium on Theory of computing, New York.
Leitão, et al., "HyParView: a membership protocol for reliable gossip-based broadcast" May 2007, 17 pages, Departamento de Informática, Faculdade de Ciências da Universidade de Lisboa, Campo Grande, Lisboa, Portugal.
Little, Mark C., e t al., "Replicated K—Resilient Objects in Arjuna" Nov. 1990, 13 pages, Proceedings of the First IEEE Workshop on Replicated Data, Houston.
Mishra, Shrivakant, et al., "Implementing Fault-Tolerance Replicate" 1989, 1 page, IEEE.
Morgan, et al., "Policies for using Replica Groups and their effectiveness over the Internet" 2000, 11 pages, Proc. 2nd International COST264 Workshop on Networked Group Communication.
Sato, Yasushi, et al., "Optimistic Replication" 1995, 44 pages, ACM Computing Surveys, vol. 5, No. N.

* cited by examiner

*Primary Examiner* — Wing Chan
*Assistant Examiner* — Andrew Woo
(74) *Attorney, Agent, or Firm* — Lowenstein Sandler LLP (57) ABSTRACT

A computing device performs an operation by a first computing device and updates a shared system state on the first computing device based on the operation. The computing device causes the shared system state to be updated on a second computing device using a strongly consistent replication mechanism, wherein the first computing device and the second computing device are members of a first consistency domain. The computing device also causes the shared system state to be updated on a third computing device using a weakly consistent replication mechanism, wherein the third computing device is a member of a second consistency domain.

12 Claims, 5 Drawing Sheets

CONSISTENCY DOMAINS FOR REPLICATION IN DISTRIBUTED COMPUTING

TECHNICAL FIELD

Embodiments of the present invention relate to replication, and more specifically to using consistency domains to reduce the overhead associated with replicating resources.

BACKGROUND OF THE INVENTION

To maintain high availability of data despite entity failures, systems often replicate entities that store and/or process the data. Replication is divided into strongly consistent replication (also known as pessimistic replication) and weakly consistent replication (also known as optimistic replication). In weakly consistent replication, replicas are allowed to diverge temporarily as long as they will eventually come to agreement. In strongly consistent replication, the system ensures that every replica will have the same system state.

Strongly consistent replication introduces the problem of large overhead. With strongly consistent replication, the system cannot continue until all replicas have been updated, and have reported their successful updates. This problem becomes exacerbated as the number of replicas increases, and as geographic separation of replicas increases. Weakly consistent replication introduces the problem of data loss in the event of device failure. Thus, both weakly consistent replication and strongly consistent replication have distinct advantages and disadvantages.

BRIEF DESCRIPTION OF THE DRAWINGS

The present invention is illustrated by way of example, and not by way of limitation, in the figures of the accompanying drawings and in which.

DETAILED DESCRIPTION OF THE PRESENT INVENTION

Described herein are a method and apparatus for using consistency domains to perform replication. The consistency domains can provide the advantages of both weakly consistent replication and the advantages of strongly consistent replication. In one embodiment, a first computing device performs an operation and updates a shared system state on the first computing device based on the operation. The computing device is a member of a first consistency domain, and is in communication with members of one or more additional consistency domains. The shared system state is shared with members of the first consistency domain and the one or more additional consistency domains.

The computing device causes the shared system state to be updated on a second computing device that is a member of the first consistency domain using a strongly consistent replication mechanism. In one embodiment, the computing device sends a first message to the second computing device. The first message causes the second computing device to update the shared system state on the second computing device. The computing device additionally causes the shared system state to be updated on a third computing device that is a member of one of the additional consistency domains using a weakly consistent replication mechanism. In one embodiment, the computing device sends a second message to the third computing device. The second message causes the third computing device to update the shared system state on the third computing device. After determining that the second computing device has updated the shared system state, the computing device performs another operation and updates the shared system state on the first computing device, regardless of whether the third computing device has updated the shared system state.

By dividing a replication group into two or more consistency domains and defining separate replication policies for the different consistency domains, some copies of the resources may be maintained using strongly consistent replication and other copies of the resources may be maintained using weakly consistent replication. Thus, embodiments of the present invention enable a distributed system to replicate resources in a manner that includes advantages of strongly consistent replication and advantages of weakly consistent replication, while minimizing the disadvantages of both replication techniques.

Figure 1:
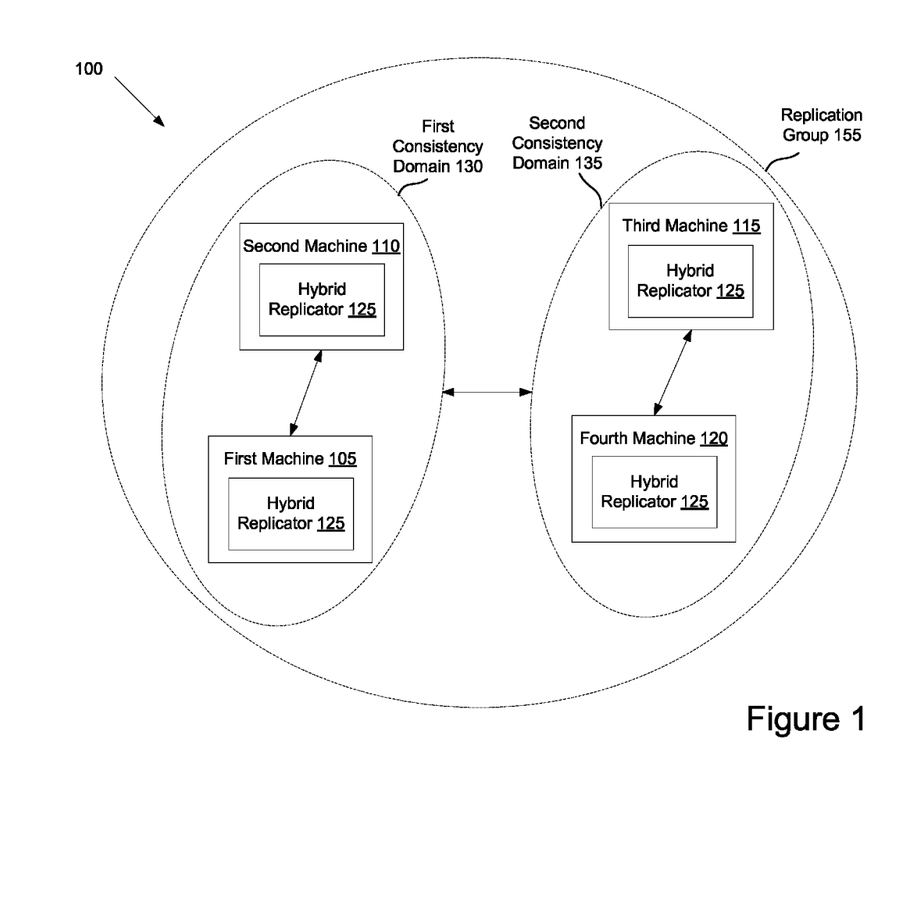
FIG. 1 illustrates an exemplary distributed computing system, in which embodiments of the present invention may operate.

FIG. 1 illustrates an exemplary distributed computing system 100, in which embodiments of the present invention may operate. The distributed computing system 100 includes multiple machines (e.g., first machine 105, second machine 110, third machine 115 and fourth machine 120) connected via a network (not shown). The network may be a public network (e.g., Internet), a private network (e.g., Ethernet or a local area Network (LAN)), or a combination thereof.

Machines 105-120 may be desktop computers, laptop computers, personal digital assistants (PDAs), mobile phones, tablet computers, server computers, or other computing devices. One or more of the machines 105-120 may include a cluster of computing devices. Each of the machines 105-120 may include an operating system that manages an allocation of resources of the machine (e.g., by allocating memory, prioritizing system requests, controlling input and output devices, managing file systems, facilitating networking, etc.). Each of the machines 105-120 may additionally include client and/or server software that runs on the operating system. Client software may be an application that runs on a machine, and that accesses services. Each of the machines 105-120 may also include one or more services that run on the operating system and/or on server software. A service is a discretely defined set of contiguous and autonomous functionality (e.g., business functionality, technical functionality, etc.). A service may represent a process, activity or other resource that can be accessed and used by other services or clients on the network. Moreover, the machines may include file systems, directories, repositories, or other data stores.

A distributed computing system 100 that includes replicated resources can distribute load between many replicas (e.g., machines). Clients can access the distributed computing system 100 (e.g., use a service provided by the system) by accessing any of the replicas. Therefore, a service or other resource may be available as long as a client has access to any of the replicas.

The distributed computing system 100 includes a replication group 155. In one embodiment, the replication group 155 includes machines 105-120. Each member of the replication group (e.g., machines 105-120) includes a copy of the same resources, and preferably shares the same group system state. The resources may include a repository, data storage, application server, one or more services, and/or other resources. The group members (machines 105-120) use multiple replication mechanisms and/or policies to coordinate changes to the group system state with the other members. The multiple replication mechanisms and/or policies enable the members of the replication group 155 to maintain different levels of consistency with one another. Members of the replication group 155 are consistent if they have the same system state, and are inconsistent if they have different system states.

In one embodiment, the replication group 155 is divided into consistency domains (e.g., first consistency domain 130 and second consistency domain 135). A consistency domain is a logical grouping of replicas (e.g., machines) that will share a system state with one another according to a particular replication policy or policies. Members of a consistency domain may be located close to one another geographically (e.g., located on the same local area network (LAN)), or may be geographically disperse. As illustrated, first machine 105 and second machine 110 are members of first consistency domain 130 and third machine 115 and fourth machine 120 are members of second consistency domain 135. In one embodiment, members of a consistency domain are strongly consistent with one another, and members of different consistency domains are weakly consistent with one another.

Each of the machines 105-120 includes a hybrid replicator 125. The hybrid replicator 125 for a machine includes information identifying a replication group 155 and a consistency domain 130, 135 that the machine is a member of. Each hybrid replicator 125 may also include a replication group member list and/or one or more consistency domain member lists. These member lists identify other members of the replication group 155 and consistency domains 130, 135, respectively.

The hybrid replicator 125 uses a strongly consistent replication mechanism to update replicas that are members of the same consistency domain. For example, first machine 105 and second machine 110 maintain strong consistency using a strongly consistent replication mechanism. Similarly, third machine 115 and fourth machine 120 maintain strong consistency using the strongly consistent replication mechanism. A strongly consistent replication mechanism ensures that each replica performs every operation in a strictly controlled order, and may ensure that no two replicas will differ. Examples of systems that provide strongly consistent replication include ISIS, Arjuna and Psync.

The hybrid replicator 125 also uses a weakly consistent replication mechanism to update replicas that are members of other consistency domains. The weakly consistent replication mechanism allows different replicas to have different system states at any given instant, but ensures that all replicas will eventually reach the same system state if no further updates are made. Weakly consistent replication mechanisms typically use fewer network packets than strongly consistent replication mechanisms, allow caching and delayed operation, and do not slow down operation of other replicas in the replication group 155. Examples of systems that provide weakly consistent replication include domain name system (DNS), Usenet and the Bayou mobile database system.

In one embodiment, a single master model is implemented, in which the first consistency domain 130 is designated as a master consistency domain. All other consistency domains (e.g., second consistency domain 135) are designated as slave consistency domains. In the single master model, all updates originate at the master consistency domain (e.g., at first machine 105 or second machine 110). The updates are then propagated to members of the other consistency domains (e.g., second consistency domain 135) using a weakly consistent replication mechanism. In another embodiment, a multi-master model is implemented, in which updates may originate at any of the consistency domains. The consistency domain that originates an update then propagates the update to the other consistency domains. The different consistency domains negotiate with one another to determine operation ordering and to manage conflicts.

Figure 2:
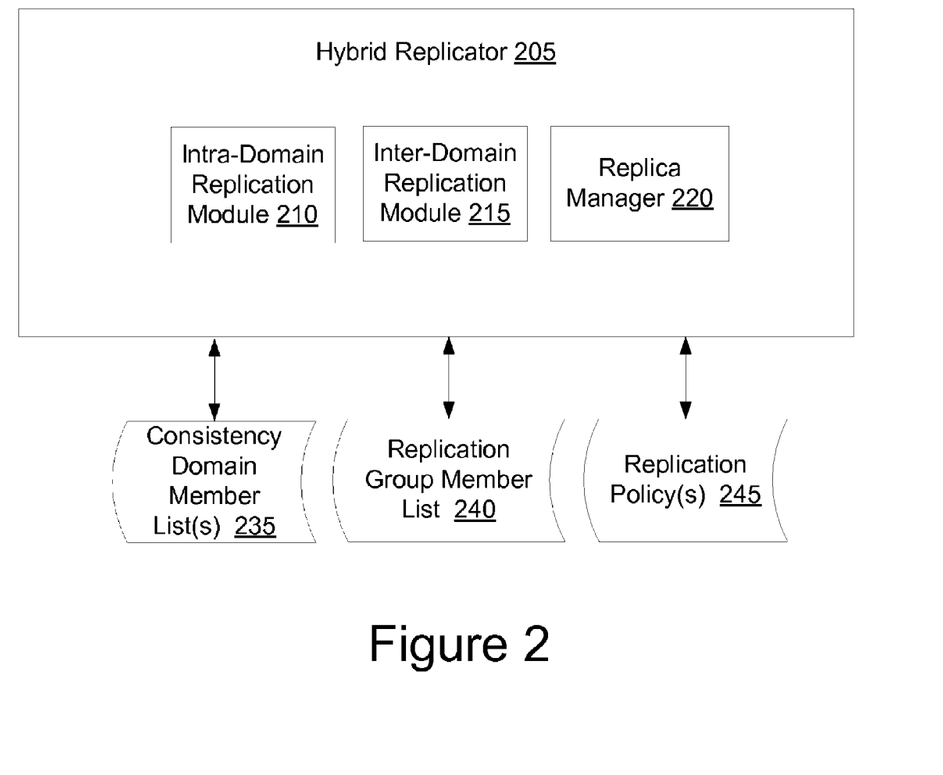
FIG. 2 illustrates a block diagram of a hybrid replicator, in accordance with one embodiment of the present invention.

FIG. 2 illustrates one embodiment of a hybrid replicator 205. In one embodiment, the hybrid replicator 205 corresponds to hybrid replicator 125 of FIG. 1. The hybrid replicator 205 may include a weak replication module 210, a strong replication module 215 and a replica manager 220.

Replica manager 220 manages membership of a replication group and/or of one or more consistency domains. This may include adding machines to a replication group or consistency domain and removing machines from a replication group or consistency domain. This may also include generating a new replication group and/or new consistency domain. Additionally, replica manager 220 may reassign machines from one consistency domain to another consistency domain.

In one embodiment, replica manager 220 maintains a replication group member list 240 and one or more consistency domain member lists 235. The replication group member list 240 may include every member of the replication group, which gives the hybrid replicator 205 a full view of the replication group. Alternatively, the replication group member list 240 may include a subset of the total membership, which provides a partial view of the replication group's membership. Each entry in both the consistency domain member lists 235 and replication group member list 240 includes an address of a particular member machine. In one embodiment, the address includes an internet protocol (IP) address and a port number. For example, the address may be a tuple (IP address, port number) that enables the hybrid replicator 205 to communicate with that group member.

In one embodiment, replica manager 220 manages replication policies 245 for a replication group and/or for one or more consistency domains. Replication policies 245 control how replication will be performed for members of a particular consistency domain or for all members of a replication group. Consistency policies may specify whether to use a pull or push model for propagating updates, a degree of consistency to maintain, how to perform operation ordering, how to resolve conflicts, whether to use a multi-master or single master model, and so on.

In one embodiment, a replication policy designates whether active replication or passive replication is to be used. In active replication, each replica performs processing of operations. As used herein, an operation is a self-contained update to a resource. In passive replication, on the other hand, a particular replica or replicas perform processing of an operation, and then stores its system state and sends the system state to the other replicas. In one embodiment, active replication is used to update members of a consistency domain, while passive replication is used to update members of other consistency domains. Alternatively, passive replication may be used to update members of a consistency domain, and active replication may be used to update members of other consistency domains.

The replication policies designate a mode of propagation. The mode of propagation may include a push-based communication protocol or a pull-based communication protocol. In a push-based communication protocol, a replica sends updates (e.g., messages containing operations or system states) to other replicas without prompting from the other replicas. For example, the replica may send updates immediately, or may log the updates and then send the updates at some later time. Updates may be sent on a periodic based (e.g., every 5 seconds, every 10 seconds), or when one or more predetermined criterion is satisfied. In a pull-based communication protocol, a machine sends updates to other machines when it receives an update request. The update request may be sent, for example, when a client attempts to access a resource on the other machine. A different mode of propagation may be used for communications between members of the same consistency domain than for communications between different consistency domains. For example, a push-based mode of propagations may be used for communications between members of the same consistency domain and a pull-based mode of propagation may be used for communications between members of different consistency domains.

The replication policies also designate scheduling for performing updates. In replication, scheduling is performed to order operations so that the same system state is reproduced at all replicas. In one embodiment, operations are ordered based on a time stamp. To enable such scheduling, each of the machines may have synchronized clocks. In another embodiment, identification of preceding operations is attached to an operation, and operations are ordered based on their preceding operations.

Additionally, the replication policies may also designate how conflicts are detected and/or how they are resolved. A conflict may happen when an operation fails to satisfy any preconditions or when two mutually exclusive updates are performed to a resource at different replicas. In strongly consistent replication, conflicts are prevented. In single master systems, conflicts are avoided since updates are only performed at a single replica or at a single consistency domain. In one embodiment, the replication policy specifies that conflicts are to be ignored. In another embodiment, the replication policy specifies that conflicts are to be resolved based on one or more parameters (e.g., based on time stamps).

In one embodiment, replication policies 245 include intra-domain replication policies and inter-domain replication policies. Intra-domain replication policies are replication policies associated with specific consistency domains, and apply to all members of that consistency domain. Intra-domain replication policies control replication among members of a consistency domain.

In one embodiment, intra-domain replication policies specify parameters for performing strongly consistent replication between members of a consistency domain. An intra-domain replication policy may specify whether updates to members of a consistency domain should be performed transactionally or via some other strongly consistent replication technique. For example, an intra-domain replication policy may specify that a two-phase commit transactional model is to be used for updating members of a consistency domain. Under such a model, no member of that consistency domain would be updated unless all members of the consistency domain verify that they can also perform the update. Alternatively, an intra-domain replication policy may specify a primary-copy algorithm, in which one member of the consistency domain is specified as the primary replica. The primary replica is then responsible for handling all access to a particular resource. After the primary replica is updated, it synchronously writes the update to the other members of the consistency domain.

Inter-domain replication policies are replication policies that apply between members of different consistency domains. For example, an inter-domain replication policy may specify that members of one consistency domain should not be different from members of another consistency domain by more than a predetermined amount, referred to herein as a skew value. In one embodiment, the intra-domain replication policy for a replication group designates whether consistency domains within the replication group will use a single master model or a multi-master model.

Consistency domains may include latency values to other consistency domains. Therefore, it may be known that the maximum time to send a message from a member of a first consistency domain to members of a second consistency domain is 2 seconds, for example. This may be based on expected performance, worst case performance, or some other performance metric. The performance metrics may be based on communication latency between machines, rates of communication failure, bandwidth, or other criteria.

In one embodiment, inter-domain replication policies specify parameters for performing weakly consistent replication between members of different consistency domains. If a consistency domain is designated as a master consistency domain, the replication policy for a slave consistency domain may specify by how much members of that slave consistency domain are allowed to diverge from members of the master consistency domain. Each slave consistency domain may include a different policy for an amount of allowed divergence (skew value) from the master consistency domain, which may be based on known latency values or other performance metrics. The skew value may be defined in terms of a time difference or in terms of a number of divergent operations. The time difference may be 2 seconds, 5 seconds, 2 minutes, etc. The number of divergent operations may be 1 divergent operations, 5 divergent operations, etc. A divergent operation is an operation that has been performed by members of one consistency domain but not by members of another consistency domain. Therefore, an application that uses a system state from a member of a consistency domain may know how stale the system state is. Based on this knowledge, the application may modify its behavior. For example, the application may not perform certain actions when the system state is stale. In one embodiment, an inter-domain replication policy specifies that a gossip communication protocol is used to propagate updates between members of different consistency domains.

Intra-domain replication module 210 applies intra-domain replication policies to maintain strong consistency between members of a consistency domain. In one embodiment, when a resource needs to perform an operation that will change its system state, intra-domain replication module 210 encodes the operation into an update message and propagates the update message to all members of the consistency domain using a specified group communication protocol. Alternatively, the intra-domain replication module 210 may transmit a message that includes a system state that resulted from performing the operation to other members of the consistency domain. The members of the consistency domain may be identified using a consistency domain member list 235. Depending on the intra-domain replication policy, the resource may perform the operation before sending the message, or may delay performing the operation until it receives confirmation from the other members of the consistency domain that they can also perform the operation.

Hybrid replicator 205 may block additional operations from being performed until intra-domain replication module 210 receives confirmation from the other members of the consistency domain that they have successfully performed the operation or otherwise applied the update. Once the intra-domain replication module 210 receives confirmation (e.g., a confirmation message) from each of the other members in the consistency domain, a next operation may be performed.

Intra-domain replication module 210 may also receive incoming messages from other members of the consistency domain. Intra-domain replication module 210 processes such incoming messages. Upon processing a message, intra-domain replication module 210 generates an acknowledgement message, and sends the acknowledgement message back to a member of the consistency domain from which the original message was received. The acknowledgement message may indicate that the replica can perform the update and/or that a host replica now shares a system state with the replica from which the message was received.

Inter-domain replication module 215 applies inter-domain replication policies to maintain weak consistency between members of different consistency domains. In one embodiment, once an operation is performed, inter-domain replication module 215 encodes the operation into a message and propagates the message to members of other consistency domains. Alternatively, inter-domain replication module 215 may transmit a message that includes a system state that resulted from performing the operation to members of the other consistency domains. The members of the other consistency domains may be identified in a replication group member list 240.

In one embodiment, the message is propagated to members of the other consistency domains using a gossip communication protocol. A gossip communication protocol is a communication protocol that enables a single replica (e.g., a single machine) to communicate with a large number of additional replicas without directly sending messages to each of those additional replicas. In a gossip communication protocol, the source replica broadcasts or multicasts the message to a group of additional replicas. Upon receiving the message, each of the additional replicas in turn sends the message to further replicas, which in turn may send the message to still more replicas. Gossip communication protocols are resilient, and distribute load among the multiple nodes of the system.

In one embodiment, inter-domain replication module 215 uses a clock to apply a time stamp to generated messages. Additionally, or alternatively, inter-domain replication module 215 may add identification of one or more preceding operations to generated message. This information may be used for scheduling of operations.

Inter-domain replication module 215 may also receive incoming messages from members of other consistency domains. When a message is received from a member of another consistency domain, the message may be forwarded to intra-domain replication module 210. The intra-domain replication module may use the contents of the message to update other members of the same consistency domain in a strongly consistent manner, as described above. Additionally, if the message was sent using a gossip communication protocol, then the inter-domain replication module 215 may forward the message on to members of other consistency domains.

Figure 3:
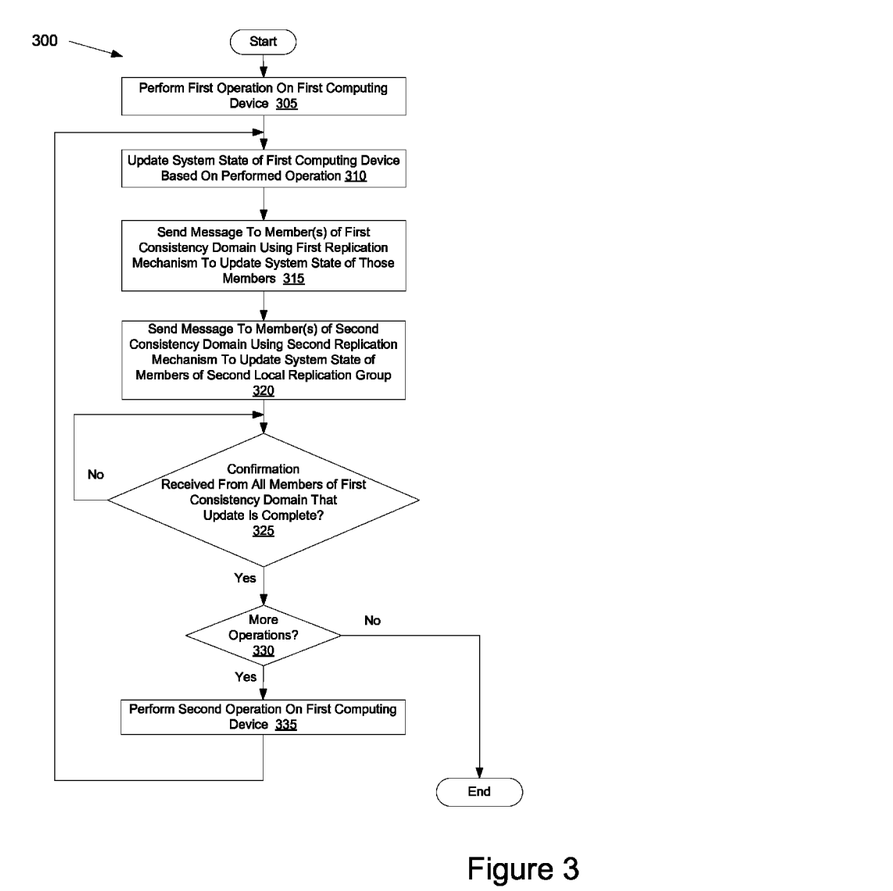
FIG. 3 illustrates a flow diagram of one embodiment for a method of performing replication.

FIG. 3 illustrates a flow diagram of one embodiment for a method 300 of maintaining consistency of a replication group. The method may be performed by processing logic that may comprise hardware (e.g., circuitry, dedicated logic, programmable logic, microcode, etc.), software (such as instructions run on a processing device), or a combination thereof. In one embodiment, method 300 is performed by a machine that includes a hybrid replicator 125, as shown in FIG. 1.

Referring to FIG. 3, at block 305 processing logic performs a first operation on a first machine that is a member of a first consistency domain. The operation may be a write operation, a read operation, or some other operation that will perform a self-contained update on a resource. At block 310, processing logic updates a system state on the first computing device based on the performed operation.

At block 315, processing logic sends a message to one or more additional computing devices that are members of the first consistency domain. The message is sent to the one or more additional computing devices in the first consistency domain using a first replication mechanism according to an intra-domain replication policy. The first replication mechanism performs strongly consistent replication and the intra-domain replication policy specifies parameters of the strongly consistent replication. The message causes the additional computing devices to update their system state to match the updated system state of the first computing device.

At block 320, processing logic sends a message to one or more additional computing devices that are members of a second consistency domain. The first consistency domain and second consistency domain are subsets of a replication group. The message is sent to the one or more additional computing devices in the second consistency domain using a second replication mechanism that performs weakly consistent replication according to an inter-domain replication policy. The message causes the additional computing devices to update their system state to match the updated system state of the first computing device.

At block 325, processing logic receives confirmation from all of the additional computing devices in the first consistency domain that they successfully updated their system state to match the first computing device's system state. Note that confirmation may or may not be received from the one or more additional computing devices in the second consistency domain that those additional computing devices have also updated their system states to match the first computing device's system state.

At block 330, processing logic determines whether there are any additional operations to perform. If there are additional operations to perform, the method proceeds to block 335 and processing logic performs a second operation on the first computing device. The method then continues to blocks 310 and 315 to propagate updates to the members of the first consistency domain and the second consistency domain. If at block 330 processing logic determines that there are no additional operations to perform, the method ends.

Figure 4:
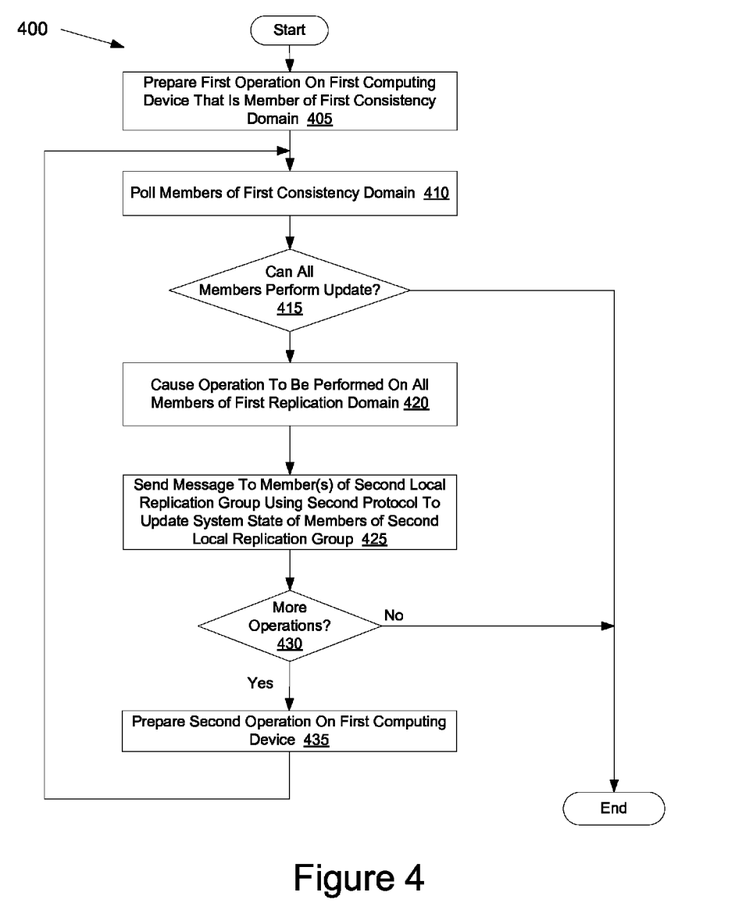
FIG. 4 illustrates a flow diagram of another embodiment for a method of performing replication.

FIG. 4 illustrates a flow diagram of another embodiment for a method 400 of maintaining consistency of a replication group. The method may be performed by processing logic that may comprise hardware (e.g., circuitry, dedicated logic, programmable logic, microcode, etc.), software (such as instructions run on a processing device), or a combination thereof. In one embodiment, method 400 is performed by a machine that includes a hybrid replicator 125, as shown in FIG. 1. In method 400, an intra-domain replication policy causes members of the same consistency domain to be replicated transactionally.

Referring to FIG. 4, at block 405 processing logic prepares an operation on a first computing device that is a member of a first consistency domain. At block 410, processing logic polls additional members of the first consistency domain. In response to the poll, the additional members send commit or rollback response messages back to the first computing device. At block 415, processing logic uses the received commit and/or roll back responses to determine whether all members of the consistency domain can perform the operation. If commit responses are received from all members of the consistency domain, then processing logic determines that all members can perform the operation. If processing logic receives a rollback response from any of the members of the consistency domain, then processing logic determines that not all members can perform the operation. If all members can perform the operation, the method continues to block 420. Otherwise, the method ends.

At block 420, processing logic causes all members of the first consistency domain to perform the operation. This may include performing the operation at the first computing device by the processing logic and sending commit messages to each of the additional members of the first consistency domain. Upon receiving the commit messages, the additional group members may perform the operation.

At block 425, processing logic sends a message to one or more additional computing devices that are members of a second consistency domain. The first consistency domain and second consistency domain are subsets of a replication group. The message is sent to the one or more additional computing devices in the second consistency domain using a second replication mechanism that performs weakly consistent replication according to an inter-domain replication policy. The message causes the additional computing devices to update their system state to match the updated system state of the first computing device. The message may include an operation for the additional computing devices to perform, or may include an updated system state for the additional computing devices to store.

At block 430, processing logic determines whether there are any additional operations to perform. If there are additional operations to perform, the method proceeds to block 435 and processing logic prepares a second operation on the first computing device. The method then returns to block 410. If at block 430 processing logic determines that there are no additional operations to perform, the method ends.

Figure 5:
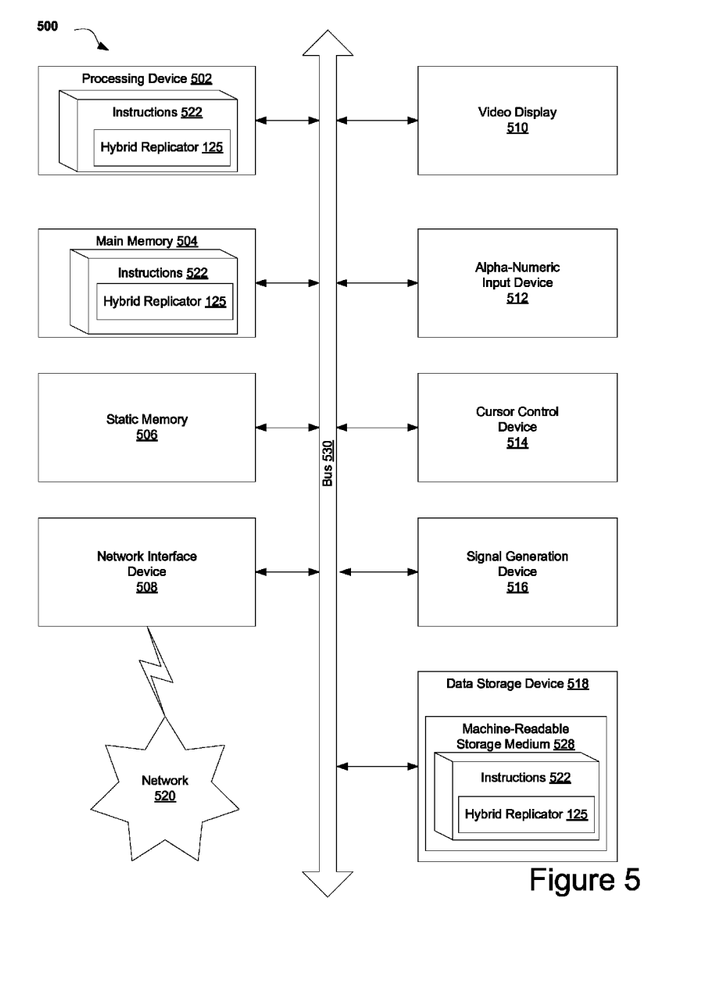
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one embodiment, the instructions 522 include instructions for a hybrid replicator (e.g., hybrid replicator 205 of FIG. 2) and/or a software library containing methods that call a hybrid replicator. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, optical media and magnetic media.

Thus, techniques for using a gossip communication protocol to communicate across a network partition are described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "sending" or "performing" or "causing" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
performing a first operation by a first computing device;
updating a shared system state on the first computing device in view of performing the first operation;
causing the shared system state to be updated on a second computing device using a first strongly consistent replication, wherein the first computing device and the second computing device are members of a first consistency domain, wherein members of the first consistency domain use the first strongly consistent replication to update the shared system state at other members of the first consistency domain; and
causing the shared system state to be updated on a third computing device using a weakly consistent replication, wherein the third computing device is a member of a second consistency domain, wherein members of the second consistency domain use a second strongly consistent replication to update the shared system state at other members of the second consistency domain, wherein the members of the first consistency domain use the weakly consistent replication to update the shared system state at the members of the second consistency domain, wherein the second consistency domain is inconsistent from the first consistency domain by at most a skew value that is defined in view of a time difference, and wherein members of the second consistency domain achieve a consistent state with members of the first consistency domain within the time difference.

2. The method of claim 1, wherein:
causing the shared system state to be updated on the second computing device comprises sending a first message to the second computing device using the first strongly consistent replication, wherein the first message causes the second computing device to update the shared system state on the second computing device; and
causing the shared system state to be updated on the third computing device comprises sending a second message to the third computing device using the weakly consistent replication, wherein the second message causes the third computing device to update the shared system state on the third computing device.

3. The method of claim 2, further comprising:
after receiving a response message from the second computing device indicating that the second computing device has updated the shared system state, performing a second operation by the first computing device and updating the shared system state on the first computing device in view of performing the second operation, regardless of whether the third computing device has updated the shared system state.

4. The method of claim 1, wherein the weakly consistent replication includes a gossip communication protocol.

5. A non-transitory computer readable storage medium including instructions that, when executed by a first computing device, cause the first computing device to perform operations comprising:
performing a first operation by the first computing device;
updating a shared system state on the first computing device in view of performing the first operation;
causing the shared system state to be updated on a second computing device using a first strongly consistent replication, wherein the first computing device and the second computing device are members of a first consistency domain, wherein members of the first consistency domain use the first strongly consistent replication to update the shared system state at other members of the first consistency domain; and causing the shared system state to be updated on a third computing device using a weakly consistent replication, wherein the third computing device is a member of a second consistency domain, wherein members of the second consistency domain use a second strongly consistent replication to update the shared system state at other members of the second consistency domain, wherein the members of the first consistency domain use the weakly consistent replication to update the shared system state at the members of the second consistency domain, wherein the second consistency domain is inconsistent from the first consistency domain by at most a skew value that is defined in view of a time difference, and wherein members of the second consistency domain achieve a consistent state with members of the first consistency domain within the time difference.

6. The non-transitory computer readable storage medium of claim 5, wherein:

causing the shared system state to be updated on the second computing device comprises sending a first message to the second computing device using the first strongly consistent replication, wherein the first message causes the second computing device to update the shared system state on the second computing device; and causing the shared system state to be updated on the third computing device comprises sending a second message to the third computing device using the weakly consistent replication, wherein the second message causes the third computing device to update the shared system state on the third computing device.

7. The non-transitory computer readable storage medium of claim 6, wherein the operations further comprise:

after receiving a response message from the second computing device indicating that the second computing device has updated the shared system state, performing a second operation by the first computing device and updating the shared system state on the first computing device in view of performing the second operation, regardless of whether the third computing device has updated the shared system state.

8. The non-transitory computer readable storage medium of claim 5, wherein the weakly consistent replication includes a gossip communication protocol.

9. A system comprising:

a memory to store instructions; and a first computing device to execute the instructions to:

perform a first operation;

update a shared system state on the first computing device in view of the performance of the first operation;

cause the shared system state to be updated on a second computing device using a first strongly consistent replication, wherein the first computing device and the second computing device are members of a first consistency domain, wherein members of the first consistency domain use the first strongly consistent replication to update the shared system state at other members of the first consistency domain; and cause the shared system state to be updated on a third computing device using a weakly consistent replication, wherein the third computing device is a member of a second consistency domain, wherein members of the second consistency domain use a second strongly consistent replication to update the shared system state at other members of the second consistency domain, wherein the members of the first consistency domain use the weakly consistent replication to update the shared system state at the members of the second consistency domain, wherein the second consistency domain is inconsistent from the first consistency domain by at most a skew value that is defined in view of a time difference, and wherein members of the second consistency domain achieve a consistent state with members of the first consistency domain within the time difference.

10. The system of claim 9, wherein:

the second computing device, which is networked with the first computing device, is to receive a first message from the first computing device via the first strongly consistent replication, to process the first message to update the shared system state on the second computing device, and to send a response message to the first computing device indicating that the second computing device has updated the shared system state; and the third computing device, which is networked with the first computing device, is to receive a second message from the first computing device via the weakly consistent replication, and to process the second message to update the shared system state on the third computing device.

11. The system of claim 10, wherein the first computing device is further to execute the instructions to:

after receiving a response message from the second computing device indicating that the second computing device has updated the shared system state, perform a second operation and update the shared system state on the first computing device in view of performing the second operation, regardless of whether the third computing device has updated the shared system state.

12. The system of claim 9, wherein the weakly consistent replication includes a gossip communication protocol.

* * * * *